(12) United States Patent
Su et al.

(10) Patent No.: US 12,394,844 B2
(45) Date of Patent: Aug. 19, 2025

(54) END COVER ASSEMBLY, BATTERY, ELECTRIC DEVICE, BATTERY CELL, AND MANUFACTURING METHOD THEREOF

(71) Applicant: CONTEMPORARY AMPEREX TECHNOLOGY (HONG KONG) LIMITED, Hong Kong (CN)

(72) Inventors: Huasheng Su, Ningde (CN); Chengyou Xing, Ningde (CN); Yichen Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 165 days.

(21) Appl. No.: 18/344,861

(22) Filed: Jun. 30, 2023

(65) Prior Publication Data

US 2023/0344044 A1 Oct. 26, 2023

Related U.S. Application Data

(63) Continuation of application No. PCT/CN2021/125104, filed on Oct. 20, 2021.

(30) Foreign Application Priority Data

Dec. 30, 2020 (CN) .......................... 202011642712.5

(51) Int. Cl.
*H01M 50/166* (2021.01)
*H01M 10/0587* (2010.01)
(Continued)

(52) U.S. Cl.
CPC ..... *H01M 50/166* (2021.01); *H01M 10/0587* (2013.01); *H01M 50/152* (2021.01);
(Continued)

(58) Field of Classification Search
CPC ........... H01M 50/166; H01M 10/0587; H01M 50/152; H01M 50/375; H01M 50/528;
(Continued)

(56) References Cited

U.S. PATENT DOCUMENTS

2003/0022061 A1* 1/2003 Duprey ................. H01M 10/28
429/174
2005/0174092 A1 8/2005 Dougherty et al.
(Continued)

FOREIGN PATENT DOCUMENTS

CN 102013513 A 4/2011
CN 106410079 A 2/2017
(Continued)

OTHER PUBLICATIONS

CN 106410079 A1 English Machine Translation (Year: 2017).*
(Continued)

*Primary Examiner* — Nicholas A Smith
*Assistant Examiner* — Kevin Nguyen
(74) *Attorney, Agent, or Firm* — K&L Gates LLP

(57) ABSTRACT

Provided are an end cover assembly, a battery, an electric device, a battery cell, and a manufacturing method thereof, pertaining to the technical field of batteries. The end cover assembly includes an end cover, a first electrode terminal, a second electrode terminal, a connecting member, and a pressure relief mechanism. The first electrode terminal is installed on the end cover; and the second electrode terminal is installed on the end cover. The connecting member is configured to be connected to the first electrode terminal and the second electrode terminal, where the connecting member is on a side of the end cover farther away from inside of the battery cell in a first direction. The pressure relief mechanism is disposed on the end cover, the pressure relief mechanism is at least partially located between the first electrode terminal and the second electrode terminal.

17 Claims, 9 Drawing Sheets

(51) Int. Cl.
  *H01M 50/152* (2021.01)
  *H01M 50/375* (2021.01)
  *H01M 50/528* (2021.01)
  *H01M 50/55* (2021.01)
  *H01M 10/052* (2010.01)

(52) U.S. Cl.
  CPC ....... *H01M 50/375* (2021.01); *H01M 50/528* (2021.01); *H01M 50/55* (2021.01); *H01M 10/052* (2013.01); *H01M 2220/20* (2013.01)

(58) Field of Classification Search
  CPC ............... H01M 50/55; H01M 10/052; H01M 2220/20; H01M 50/3425; H01M 50/559; H01M 10/058; H01M 50/30
  USPC ........................................................ 429/175
  See application file for complete search history.

(56) References Cited

U.S. PATENT DOCUMENTS

| | | | |
|---|---|---|---|
| 2008/0220315 | A1 | 9/2008 | Dougherty et al. |
| 2011/0287286 | A1* | 11/2011 | Ahn .................. H01M 50/3425 429/56 |
| 2014/0087217 | A1 | 3/2014 | Zink et al. |
| 2015/0214525 | A1* | 7/2015 | Lim .................. H01M 10/0481 429/53 |
| 2018/0130981 | A1* | 5/2018 | Liu ..................... H01M 50/213 |
| 2019/0355943 | A1 | 11/2019 | Chen et al. |

FOREIGN PATENT DOCUMENTS

| | | |
|---|---|---|
| CN | 207474505 U | 6/2018 |
| CN | 108281578 A | 7/2018 |
| CN | 208173680 U | 11/2018 |
| CN | 110265616 A | 9/2019 |
| CN | 111952515 A | 11/2020 |
| CN | 211879534 U | 11/2020 |
| CN | 211929598 U | 11/2020 |
| CN | 112117425 A | 12/2020 |
| CN | 214898799 U | 11/2021 |
| EP | 0771037 A1 | 5/1997 |
| JP | 2005276660 A | 10/2005 |
| JP | 2010092592 A | 4/2010 |
| JP | 4698159 B2 | 6/2011 |
| JP | 2018026285 A | 2/2018 |
| JP | 2020099368 A | 7/2020 |
| JP | 2021193651 A | 12/2021 |

OTHER PUBLICATIONS

International Search Report received in the corresponding International Application PCT/CN2021/125104, mailed Jan. 18, 2022.
Decision to Grant a Patent received in the counterpart Japanese application 2023-530681, mailed on Nov. 26, 2024.
First Office Action received in the counterpart Chinese application 202011642712.5, mailed on Dec. 2, 2022.
Notice of Grant of Invention Patent Right received in the counterpart Chinese application 202011642712.5, mailed on May 29, 2023.
The extended European search report received in the counterpart European application 21913354.3, mailed on Sep. 9, 2024.
Notice of Reasons for Refusal received in the counterpart Japanese application 2023-530681, mailed on Jun. 25, 2024.

* cited by examiner

END COVER ASSEMBLY, BATTERY, ELECTRIC DEVICE, BATTERY CELL, AND MANUFACTURING METHOD THEREOF

CROSS-REFERENCE TO RELATED APPLICATIONS

This application is a continuation of International Application PCT/CN2021/125104, filed Dec. 30, 2020, which claims priority to Chinese Patent Application No. 202011642712.5, filed on Dec. 30, 2020 and entitled "END COVER ASSEMBLY, BATTERY, ELECTRIC DEVICE, BATTERY CELL, AND MANUFACTURING METHOD THEREOF", which are incorporated herein by reference in their entireties.

TECHNICAL FIELD

This application relates to the field of battery technologies, and specifically, to an end cover assembly, a battery, an electric device, a battery cell, and a manufacturing method thereof.

BACKGROUND

Most commonly used batteries in automobiles are lithium-ion batteries. As rechargeable batteries, the lithium-ion batteries have advantages such as small size, high energy density, high power density, large cycle count, and long storage time.

The rechargeable battery usually includes a housing, an end cover assembly, and an electrode assembly. The end cover assembly covers the housing to provide sealed space for the electrode assembly and an electrolyte. Electric energy of the electrode assembly can be conducted by an electrode terminal of the end cover assembly to the outside of the housing.

To ensure safety performance of the battery, a pressure relief mechanism is usually disposed in the end cover assembly. When internal pressure or temperature of the battery reaches a threshold, the internal pressure of the battery can be relieved through the pressure relief mechanism. An arrangement position of the pressure relief mechanism directly affects a capability of the pressure relief mechanism to relieve the internal pressure of the battery.

Therefore, how the pressure relief mechanism is more properly arranged is a problem that needs to be urgently resolved in the battery technology.

SUMMARY

Embodiments of this application provide an end cover assembly, a battery, an electric device, a battery cell, and a manufacturing method thereof, to ensure that a pressure relief mechanism is more properly arranged.

According to a first aspect, an embodiment of this application provides an end cover assembly, applied to a battery cell and including: an end cover, a first electrode terminal, a second electrode terminal, a connecting member, and a pressure relief mechanism, where the first electrode terminal is installed on the end cover; the second electrode terminal is installed on the end cover; the connecting member is configured to be connected to the first electrode terminal and the second electrode terminal, where the connecting member is on a side of the end cover farther away from inside of the battery cell in a first direction; and the pressure relief mechanism is disposed on the end cover, where the pressure relief mechanism is at least partially located between the first electrode terminal and the second electrode terminal, and the pressure relief mechanism is configured to be actuated when internal pressure or temperature of the battery cell reaches a threshold, to relieve the internal pressure of the battery cell.

In the foregoing solution, the pressure relief mechanism is disposed on the end cover, the pressure relief mechanism is at least partially located between the first electrode terminal and the second electrode terminal, and therefore, space of the end cover and between the first electrode terminal and the second electrode terminal is effectively used, so that the pressure relief mechanism is more properly arranged, and a larger-sized pressure relief mechanism can be disposed.

In some embodiments, a projection of the connecting member in the first direction covers at least part of the pressure relief mechanism.

In the foregoing solution, the projection of the connecting member in the first direction covers at least part of the pressure relief mechanism, so that the pressure relief mechanism effectively uses space, occupied by the connecting member, on the end cover, thereby properly using the space on the end cover.

In some embodiments, the pressure relief mechanism includes an opening region, and the pressure relief mechanism is configured to relieve the internal pressure of the battery cell through the opening region when the internal pressure or temperature of the battery cell reaches the threshold; and a projection of the connecting member in the first direction covers a part of the opening region, and a projection of the opening region in the first direction exceeds the projection of the connecting member in the first direction.

In the foregoing solution, the projection of the connecting member in the first direction covers the part of the opening region, and the projection of the opening region in the first direction exceeds the projection of the connecting member in the first direction. That is, the opening region is not completely blocked by the connecting member in the first direction, so that the internal pressure of the battery cell is more smoothly relieved through the opening region.

In some embodiments, the opening region extends along a second direction, and the connecting member extends along a third direction; and any two of the first direction, the second direction, and the third direction are perpendicular to each other.

In the foregoing solution, any two of the extending direction of the opening region, the extending direction of the connecting member, and the first direction are perpendicular to each other. Such structure ensures that a region, blocked by the connecting member, of the opening region is smaller. Therefore, the internal pressure of the battery cell is more smoothly relieved through the opening region.

In some embodiments, the opening region includes a first opening region and a second opening region, and the second opening region is arranged on at least one end of the first opening region in the second direction; the projection of the connecting member in the first direction covers at least part of the first opening region, a projection of the second opening region in the first direction exceeds the projection of the connecting member in the first direction, and width of the second opening region in the third direction is greater than width of the first opening region in the third direction; and any two of the first direction, the second direction, and the third direction are perpendicular to each other.

In the foregoing solution, width of the second opening region that is not blocked by the connecting member in the third direction is greater than width of the first opening region that is at least partially blocked by the connecting member in the third direction. With such structure, the internal pressure of the battery cell is more smoothly relieved through the opening region.

In some embodiments, the end cover assembly further includes a shielding member for shielding the pressure relief mechanism; and a first accommodation groove for accommodating the shielding member is provided on a side of the end cover closer to the connecting member.

In the foregoing solution, the shielding member can shield the pressure relief mechanism, to provide good protection for the pressure relief mechanism. The first accommodation groove is provided on a side of the end cover closer to the connecting member, and the shielding member can be accommodated in the first accommodation groove, to reduce external space of the end cover that is occupied by the shielding member.

In some embodiments, the shielding member is provided with a first through hole.

In the foregoing solution, the shielding member is provided with a first through hole, and the first through hole has a pressure balancing function for balancing pressure in a region between the shielding member and the pressure relief mechanism and external pressure.

In some embodiments, the first electrode terminal and the second electrode terminal have same polarity.

In the foregoing solution, the polarities of the first electrode terminal and the second electrode terminal are the same. In other words, the connecting member is connected to the two electrode terminals with the same polarity. The connecting member has a function of collecting electric energy, thereby enlarging a connection area between the battery cell and a busbar.

In some embodiments, the end cover assembly further includes a current collector, and the current collector is configured to be connected to the first electrode terminal, the second electrode terminal, and an electrode assembly of the battery cell; a discharge channel is disposed on the current collector; and an emission produced by the battery cell due to thermal runaway is able to be discharged to outside of the battery cell through the discharge channel and the pressure relief mechanism in sequence, to relieve the internal pressure of the battery cell.

In the foregoing solution, the discharge channel is disposed on the current collector, and therefore, when the thermal runaway occurs in the battery cell, an internal emission of the battery cell can be discharged to outside of the battery cell through the discharge channel and the pressure relief mechanism in sequence, so that the emission produced due to the thermal runaway of the battery cell can be discharged in a timely manner, to relieve internal pressure of the battery cell.

In some embodiments, the current collector includes a plurality of folding portions, a crease is formed between every two adjacent folding portions, each folding portion is provided with a second through hole, and a plurality of second through holes jointly form the discharge channel.

In the foregoing solution, the current collector is a folding structure including the plurality of folding portions, so that the current collector is easily disposed between the end cover and the electrode assembly, thereby reducing the space occupied by the current collector. Each folding portion is provided with a second through hole, and in the folded state of the current collector, the plurality of second through holes can jointly form the discharge channel.

In some embodiments, projections of the plurality of second through holes in the first direction overlap at least part of the projection of the pressure relief mechanism in the first direction.

In the foregoing solution, the projections of the plurality of second through holes in the second direction overlap at least part of the projection of the pressure relief mechanism in the first direction, so that the emission is less blocked by the current collector, and more smoothly discharged to the outside through the discharge channel and the pressure relief mechanism, allowing the emission to be more easily discharged to the outside of the battery cell.

In some embodiments, projections of the plurality of second through holes in the first direction overlap at least part of a projection of a central hole of the electrode assembly in the first direction.

In the foregoing solution, the projections of the plurality of second through holes in the first direction overlap at least part of the projection of the central hole of the electrode assembly in the first direction, and therefore, the discharge channel and the central hole of the electrode assembly jointly form a straight-through channel to balance pressure on both sides of the electrode assembly in an axial direction of the central hole, thereby reducing a risk of damage to the pressure relief mechanism caused by excessively high pressure on one side of the electrode assembly closer to the end cover.

In some embodiments, a guide protruding portion is provided on at least one side of a part, provided with the second through hole, of at least one folding portion in an extending direction of the crease.

In the foregoing solution, disposing the guide protruding portion on the folding portion can increase a current flow area of the part, provided with the second through hole, of the folding portion.

In some embodiments, the plurality of folding portions include a first folding portion, a second folding portion, and a third folding portion connected in sequence; the first folding portion is configured to be electrically connected to the first electrode terminal and the second electrode terminal; the third folding portion is configured to be electrically connected to the electrode assembly; width of the first folding portion and width of the third folding portion are both greater than width of the second folding portion in an extending direction of the crease; and a guide protruding portion is provided on at least one side of a part, provided with the second through hole, of the second folding portion in the extending direction of the crease.

In the foregoing solution, the width of the first folding portion and the width of the third folding portion are both larger than the width of the second folding portion. In this way, the width of the second folding portion is relatively small to reduce materials for the current collector, and it is also ensured that ensuring that the first folding portion is more easily connected to the first electrode terminal and the second electrode terminal, and that the third folding portion is more easily connected to the electrode assembly. Disposing the guide protruding portion on the second folding portion can increase a current flow area of the part, provided with the second through hole, of the second folding portion.

According to a second aspect, an embodiment of this application provides a battery cell, including a housing, an electrode assembly, and the end cover assembly provided in any one of the embodiments of the first aspect, where the housing has an opening; the electrode assembly is accommodated in the housing; and the end cover is configured to cover the opening, and the first electrode terminal and the second electrode terminal are configured to be electrically connected to the electrode assembly.

In the foregoing solution, the pressure relief mechanism in the battery cell effectively uses space of the end cover and between the first electrode terminal and the second electrode terminal, so that the pressure relief mechanism is more properly arranged, and a larger-sized pressure relief mechanism can be disposed.

According to a third aspect, an embodiment of this application provides a battery, including a box and the battery cell provided in any one of the embodiments of the second aspect; and the battery cell is accommodated in the box.

According to a fourth aspect, an embodiment of this application provides an electric device, including the battery cell provided in any one of the embodiments of the second aspect.

According to a fifth aspect, an embodiment of this application further provides a manufacturing method of a battery cell, including:

providing a housing, where the housing has an opening; providing an electrode assembly; providing an end cover assembly, where the end cover assembly includes: an end cover, a first electrode terminal, a second electrode terminal, a connecting member, and a pressure relief mechanism; the first electrode terminal is installed on the end cover; the second electrode terminal is installed on the end cover; the connecting member is configured to be connected to the first electrode terminal and the second electrode terminal, where the connecting member is on a side of the end cover farther away from inside of the battery cell in a first direction; and the pressure relief mechanism is disposed on the end cover, where the pressure relief mechanism is at least partially located between the first electrode terminal and the second electrode terminal, and the pressure relief mechanism is configured to be actuated when internal pressure or temperature of the battery cell reaches a threshold, to relieve the internal pressure of the battery cell; placing the electrode assembly in the housing; and covering the opening with the end cover, where the first electrode terminal and the second electrode terminal are configured to be electrically connected to the electrode assembly.

BRIEF DESCRIPTION OF DRAWINGS

To describe the technical solutions in the embodiments of this application more clearly, the following briefly describes the accompanying drawings required for describing the embodiments. It is appreciated that the accompanying drawings below only show some embodiments of this application and thus should not be considered as limitations on the scope. A person of ordinary skill in the art may still derive other related drawings from the accompanying drawings without creative efforts.

REFERENCE SIGNS

Figure 1:
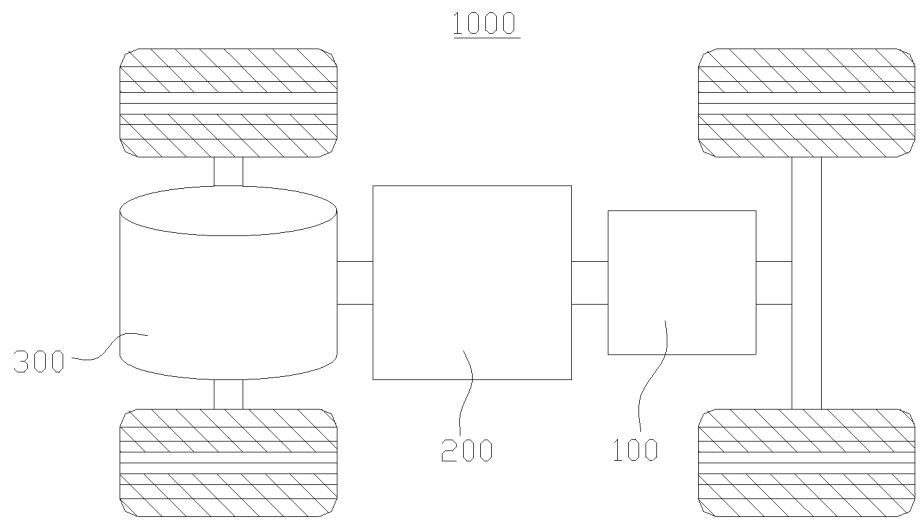
FIG. 1 is a schematic structural diagram of a vehicle according to some embodiments of this application.

10. box; 11. sealed space; 12. first part; 13. second part; 20. battery cell; 21. housing; 211. opening; 22. electrode assembly; 221. central hole; 23. end cover assembly; 231. end cover; 2311. first accommodation groove; 2312. discharge hole; 2312a. first hole; 2312b. second hole; 2313. second accommodation groove; 232. first electrode terminal; 233. second electrode terminal; 234. connecting member; 2341. first conductive segment; 2342. second conductive segment; 2343. insulation segment; 235. pressure relief mechanism; 2351. opening region; 2351a. first opening region; 2351b. second opening region; 236. first insulation member; 2361. groove; 237. shielding member; 2371. first through hole; 238. current collector; 2381. discharge channel; 2382. folding portion; 2382a. first folding portion; 2382b. second folding portion; 2382c. third folding portion; 2383. crease; 2384. second through hole; 2385. guide protruding portion; 239. second insulation member; 2391. third through hole; 240. riveting hole; 241. sealing ring; 25. protection member; 100. battery; 200. controller; 300. motor; 1000. vehicle; Z. first direction; X. second direction; and Y. third direction.

DESCRIPTION OF EMBODIMENTS

To make the objectives, technical solutions, and advantages of the embodiments of this application clearer, the following clearly describes the technical solutions in the embodiments of this application with reference to the accompanying drawings in the embodiments of this application. Apparently, the embodiments described are some rather than all embodiments of this application. All other embodiments obtained by a person of ordinary skill in the art based on the embodiments of this application without creative efforts shall fall within the protection scope of this application.

Unless otherwise defined, all technical and scientific terms used in this application shall have the same meanings as commonly understood by those skilled in the art to which this application relates. The terms used in the specification of this application are intended to merely describe the specific embodiments rather than to limit this application.

The terms "include", "comprise", and any variations thereof in the specification and claims of this application as well as the foregoing description of drawings are intended to cover non-exclusive inclusions. In the specification, claims, or accompanying drawings of this application, the terms "first", "second", and the like are intended to distinguish between different objects rather than to indicate a particular order or relative importance.

Reference to "embodiment" in this application means that specific features, structures, or characteristics described with reference to the embodiment may be included in at least one embodiment of this application. The word "embodiment" appearing in various places in the specification does not necessarily refer to the same embodiment or an independent or alternative embodiment that is exclusive of other embodiments.

In the description of this application, it should be noted that unless otherwise specified and defined explicitly, the terms "mount", "connect", "join", and "attach" should be understood in their general senses. For example, they may refer to a fixed connection, a detachable connection, or an integral connection, and may refer to a direct connection, an indirect connection via an intermediate medium, or an internal communication between two elements. A person of ordinary skill in the art can understand specific meanings of these terms in this application based on specific situations.

In the embodiments of this application, the same reference signs denote the same components. For brevity, in different embodiments, detailed descriptions of the same components are not repeated. It should be understood that, as shown in the accompanying drawings, sizes such as thickness, length, and width of various components and sizes such as thickness, length, and width of integrated devices in the embodiments of this application are merely for illustrative purposes and should not constitute any limitations on this application.

In this application, "a plurality of" means more than two (inclusive).

In this application, the battery cell may include a lithium-ion secondary battery, a lithium-ion primary battery, a lithium-sulfur battery, a sodium-lithium-ion battery, a sodium-ion battery, a magnesium-ion battery, or the like. This is not limited in the embodiments of this application. The battery cell may be cylindrical, flat, cuboid, or of other shapes, which is not limited in the embodiments of this application either. Battery cells are typically divided into three types by packaging method: cylindrical cell, prismatic cell, and pouch cell. The type of battery is not limited in the embodiments of this application either.

The battery mentioned in the embodiments of this application is a single physical module that includes one or more battery cells for providing a higher voltage and capacity. For example, the battery mentioned in this application may include a battery module, a battery pack, or the like. A battery typically includes a box configured to enclose one or more battery cells. The box can prevent liquids or other foreign matter from affecting charging or discharging of the battery cell.

The battery cell includes an electrode assembly and an electrolyte. The electrode assembly includes a positive electrode plate, a negative electrode plate, and a separator. Working of the battery cell mainly relies on migration of metal ions between the positive electrode plate and the negative electrode plate. The positive electrode plate includes a positive electrode current collector and a positive electrode active substance layer. The positive electrode active substance layer is applied on a surface of the positive electrode current collector. The part of positive electrode current collector uncoated with the positive electrode active substance layer protrudes out of the part of positive electrode current collector coated with the positive electrode active substance layer and serves as a positive tab. A lithium-ion battery is used as an example, for which, the positive electrode current collector may be made of aluminum and the positive electrode active substance may be lithium cobaltate, lithium iron phosphate, ternary lithium, lithium manganate, or the like. The negative electrode plate includes a negative electrode current collector and a negative electrode active substance layer. The negative electrode active substance layer is applied on a surface of the negative electrode current collector. The part of negative electrode current collector uncoated with the negative electrode active substance layer protrudes out of the part of negative electrode current collector coated with the negative electrode active substance layer and serves as a negative tab. The negative electrode current collector may be made of copper, and the negative electrode active substance may be carbon, silicon, or the like. To allow a large current to pass through without any fusing, multiple positive tabs are provided and stacked together, and multiple negative tabs are provided and stacked together. The separator may be made of PP (polypropylene, polypropylene), PE (polyethylene, polyethylene), or the like. In addition, the electrode assembly may be a winding structure or a laminated structure, but the embodiments of this application are not limited thereto.

For the development of battery technology, many design factors need to be considered, for example, performance parameters such as energy density, cycle life, discharge capacity, and charge and discharge rate, as well as safety of the battery.

For the battery cell, a main safety hazard originates from charging and discharging processes, and an appropriate ambient temperature design is also required. To effectively avoid unnecessary loss, usually at least three protective measures are taken for the battery cell. Specifically, the protective measures include at least a switch element, selection of an appropriate separator material, and a pressure relief mechanism. The switch element refers to an element that can stop charging or discharging of the battery when temperature or resistance in the battery cell reaches a specific threshold. The separator is configured to separate a positive electrode plate and a negative electrode plate. When temperature rises to a specific numerical value, microscale (or even nanoscale) micropores attached to the separator may be automatically dissolved, so that metal ions cannot pass through the separator, thereby terminating a reaction inside the battery cell.

The pressure relief mechanism is an element or a part that is actuated when the internal pressure or temperature of the battery cell reaches a predetermined threshold, so as to relieve internal pressure or temperature of the battery cell. The threshold design varies with a design requirement. The threshold may depend on the material used for one or more of the positive electrode plate, negative electrode plate, electrolyte, and separator in the battery cell. The pressure relief mechanism may be in a form of an explosion-proof valve, a rupture disk, a gas valve, a pressure relief valve, a safety valve, or the like, and may specifically use a pressure sensitive or temperature sensitive component or structure. To be specific, when internal pressure or temperature of the battery cell reaches the predetermined threshold, the pressure relief mechanism performs an action or a weak structure provided in the pressure relief mechanism is destroyed, thereby forming an opening or channel for relief of the internal pressure or temperature.

"Actuate" mentioned in this application means that the pressure relief mechanism is put into action or is activated to a given state such that the internal pressure and temperature of the battery cell are relieved. The action that the pressure relief mechanism is put into may include but is not limited to, for example, cracking, breaking, tearing, or opening at least part of the pressure relief mechanism. When the pressure relief mechanism is actuated, the high-temperature and high-pressure substances inside the battery cell are discharged as emissions from an actuated site. In this way, the battery cell can relieve its pressure and temperature under controllable pressure or temperature, thereby avoiding more serious potential incidents.

The emissions from the battery cell mentioned in this application include but are not limited to: electrolyte, fragments of positive and negative electrode plates and separator because of dissolution or breaking, high-temperature and high-pressure gases and flames produced by reactions, and the like.

The pressure relief mechanism in the battery cell greatly influences the safety of the battery. For example, when a short circuit, overcharging, or the like occurs, thermal runaway may be caused inside the battery cell, resulting in a sudden rise in pressure or temperature. In this case, the pressure relief mechanism can be actuated to relieve the internal pressure and temperature to the outside, thus preventing the battery cell from exploding and catching fire.

The inventors have found that in the battery cell, the pressure relief mechanism is generally arranged in a duct on the electrode terminal, and a size of the pressure relief mechanism is limited by a size of the electrode terminal. Because of improper arrangement of the pressure relief mechanism, a pressure relief mechanism of a large size cannot be arranged in the battery cell, and as a result, a pressure relief capability of the pressure relief mechanism is low.

In view of this, an embodiment of this application provides a technical solution, at least part of a pressure relief mechanism is disposed between a first electrode terminal and a second electrode terminal, so that space of an end cover and between the first electrode terminal and the second electrode terminal can be effectively used to dispose a pressure relief mechanism of a larger size, thereby improving the pressure relief capability of the pressure relief mechanism.

The technical solution described in the embodiments of this application is applicable to batteries and electric devices using a battery.

The electric device may be a vehicle, a mobile phone, a portable device, a notebook computer, a ship, a spacecraft, an electric toy, an electric tool, or the like. The vehicle may be a fossil fuel vehicle, a natural gas vehicle, or a new energy vehicle. The new energy vehicle may be a battery electric vehicle, a hybrid electric vehicle, a range-extended electric vehicle, or the like. The spacecraft includes an airplane, a rocket, a space shuttle, a spaceship, and the like. The electric toy includes a fixed or mobile electric toy, for example, a game console, an electric toy car, an electric toy ship, an electric toy airplane, and the like. The electric tool includes an electric metal cutting tool, an electric grinding tool, an electric assembly tool, and an electric railway-specific tool, for example, an electric drill, an electric grinder, an electric wrench, an electric screwdriver, an electric hammer, an electric impact drill, a concrete vibrator, and an electric planer. The embodiments of this application impose no special limitation on the foregoing electric device.

For ease of description, the electric device being a vehicle is used as example for description of the following embodiments.

Referring to FIG. 1, FIG. 1 is a schematic structural diagram of a vehicle 1000 according to some embodiments of this application. The vehicle 1000 is provided with a battery 100 inside, where the battery 100 may be disposed at the bottom, front or rear of the vehicle 1000. The battery 100 may be configured to supply power to the vehicle 1000. For example, the battery 100 may be used as an operational power source for the vehicle 1000.

The vehicle 1000 may further include a controller 200 and a motor 300, where the controller 200 is configured to control the battery 100 to supply power to the motor 300, for example, to satisfy power needs of start, navigation, and driving of the vehicle 1000.

In some embodiments of this application, the battery 100 can be used as not only the operational power source for the vehicle 1000 but also a driving power source for the vehicle 1000, replacing or partially replacing fossil fuel or natural gas to provide driving traction for the vehicle 1000.

Figure 2:
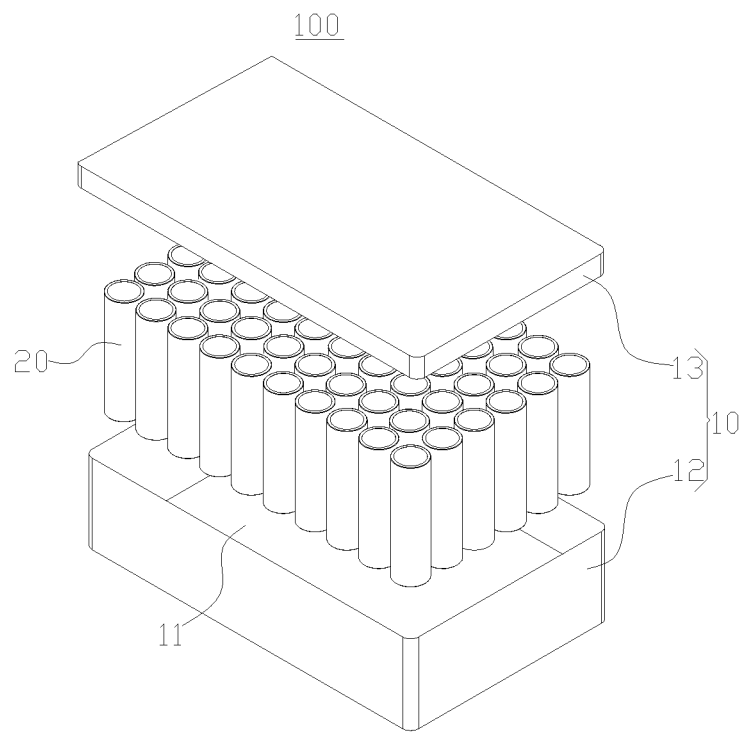
FIG. 2 is a schematic structural diagram of a battery according to some embodiments of this application.

Referring to FIG. 2, FIG. 2 is a schematic structural diagram of a battery 100 according to some embodiments of this application. The battery 100 includes a box 10 and a battery cell 20, and the battery cell 20 is accommodated in the box 10.

The box 10 is configured to provide a sealed space 11 for the battery cell 20. In some embodiments, the box 10 may include a first part 12 and a second part 13. The first part 12 and the second part 13 are engaged with each other to jointly define the sealed space 11 for accommodating the battery cell 20. Certainly, a joint of the first part 12 and the second part 13 can be sealed by a sealing member (not shown in the figure), and the sealing member may be a sealing ring, a sealing adhesive, or the like.

The first part 12 and the second part 13 may have a variety of shapes, for example, cuboid, cylinder, or the like. The first part 12 may be a hollow structure with one side open, and the second part 13 may also be a hollow structure with one side open, where the opening side of the second part 13 is engaged with the opening side of the first part 12 so as to form the box 10 having the sealed space 11. Certainly, as shown in FIG. 2, the first part 12 may be a hollow structure with one side open, and the second part 13 may be a plate structure, where and the second part 13 covers the opening side of the first part 12 so as to form the box 10 having the sealed space 11.

In the battery 100, one or a plurality of battery cells 20 may be provided. If a plurality of battery cells 20 are provided, the plurality of battery cells 20 may be connected in series, parallel, or series-parallel, where being connected in series-parallel means a combination of series and parallel connections of the plurality of battery cells 20. The plurality of battery cells 20 may be directly connected in series, parallel or series-parallel, and then an entirety of the plurality of battery cells 20 is accommodated in the box 10; or certainly, the plurality of battery cells 20 may be connected in series, parallel or series-parallel first to form a battery module and then a plurality of battery modules are connected in series, parallel or series-parallel to form an entirety which is accommodated in the box 10. The battery cell 20 may be cylindrical, flat, cuboid, or have other shapes. FIG. 2 shows an example of a cylindrical battery cell 20.

In some embodiments, the battery 100 may further include a busbar (not shown in the figure), and the plurality of battery cells 20 may be electrically connected through the busbar, so as to connect the plurality of battery cells 20 in series, parallel, or series-parallel.

Figure 3:
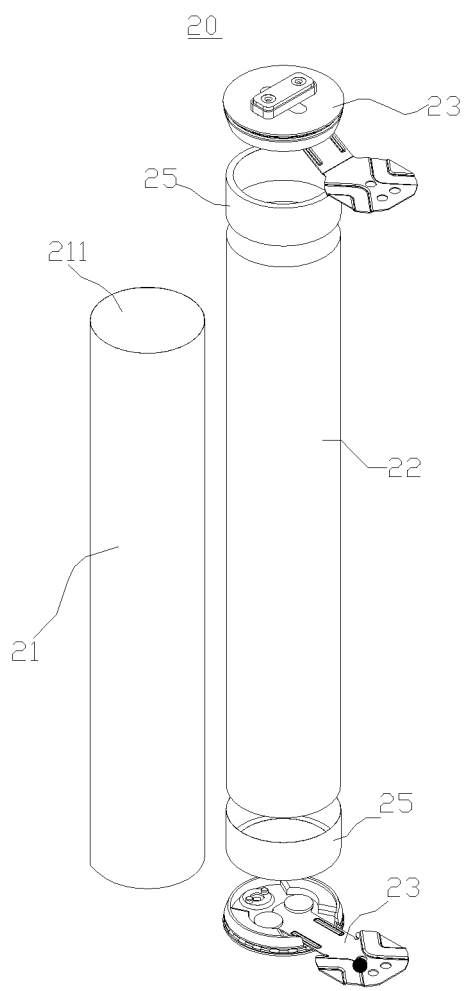
FIG. 3 is an exploded view of a battery cell according to some embodiments of this application.

Referring to FIG. 3, FIG. 3 is an exploded view of a battery cell 20 according to some embodiments of this application. The battery cell 20 may include a housing 21, an electrode assembly 22, and an end cover assembly 23. The housing 21 has an opening 211, the electrode assembly 22 is accommodated in the housing 21, and the end cover assembly 23 is configured to cover the opening 211.

The housing 21 may have various shapes, such as a cylindrical shape and a cuboid shape. The shape of the housing 21 may be determined based on a specific shape of the electrode assembly 22. For example, if the electrode assembly 22 is a cylindrical structure, the housing 21 may use a cylindrical structure; or if the electrode assembly 22 is a cuboid structure, the housing 21 may use a cuboid structure. FIG. 3 shows an example of a cylindrical housing 21 and a cylindrical electrode assembly 22.

The housing 21 may be made of various materials, for example, copper, iron, aluminum, stainless steel, and aluminum alloy. This is not particularly limited in the embodiments of this application.

The electrode assembly 22 may include a positive electrode plate (not shown in the figure), a negative electrode plate (not shown in the figure), and a separator (not shown in the figure). The electrode assembly 22 may be a wound structure formed by winding the positive electrode plate, the separator, and the negative electrode plate, or may be a stacked structure formed by stacking the positive electrode plate, the separator, and the negative electrode plate. The electrode assembly 22 further includes a positive tab (not shown in the figure) and a negative tab (not shown in the figure), a positive electrode current collector, uncoated with a positive electrode active substance layer, of the positive electrode plate may be used as the positive tab, and a negative electrode current collector, uncoated with a negative electrode active substance layer, of the negative electrode plate may be used as the negative tab.

The end cover assembly 23 is configured to cover the opening 211 of the housing 21 to form a sealed accommodation space (not shown in the figure), and the accommodation space is configured to accommodate the electrode assembly 22. The accommodation space is also configured to accommodate an electrolyte such as a liquid electrolyte. The end cover assembly 23 is used as a component for outputting electric energy of the electrode assembly 22, and an electrode terminal in the end cover assembly 23 is configured to be electrically connected to the electrode assembly 22. That is, the electrode terminal is electrically connected to a tab of the electrode assembly 22. For example, the electrode terminal is connected to the tab through a current collector 238 (refer to FIG. 11), so as to electrically connect the electrode terminal to the tab.

It should be noted that the housing 21 may have one or two openings 211. If the housing 21 has one opening 211, there may also be one end cover assembly 23. Two electrode terminals can be disposed in the end cover assembly 23. The two electrode terminals are respectively configured to be electrically connected to the positive tab and the negative tab of the electrode assembly 22. The two electrode terminals in the end cover assembly 23 are respectively a positive electrode terminal and a negative electrode terminal. As shown in FIG. 3, if the housing 21 has two openings 211, for example, the two openings 211 are disposed on two opposite sides of the housing 21, there may also be two end cover assemblies 23. The two end cover assemblies 23 respectively cover the two openings 211 of the housing 21. In this case, an electrode terminal in one end cover assembly 23 may be a positive electrode terminal configured to be electrically connected to the positive tab of the electrode assembly 22, and an electrode terminal in the other end cover assembly 23 is a negative electrode terminal configured to be electrically connected to the negative electrode plate of the electrode assembly 22.

In some embodiments, as shown in FIG. 3, the battery cell 20 may further include protection members 25 fixed on the tabs (not shown in the figure), and the protection members 25 are configured to insulate and isolate the tabs from the housing 21. One protection member 25 isolates the positive tab of the electrode assembly 22 from the housing 21, and the other protection member 25 isolates the negative tab of the electrode assembly 22 from the housing. For example, the protection member 25 is an adhesive tape bound to the tab.

Figure 4:
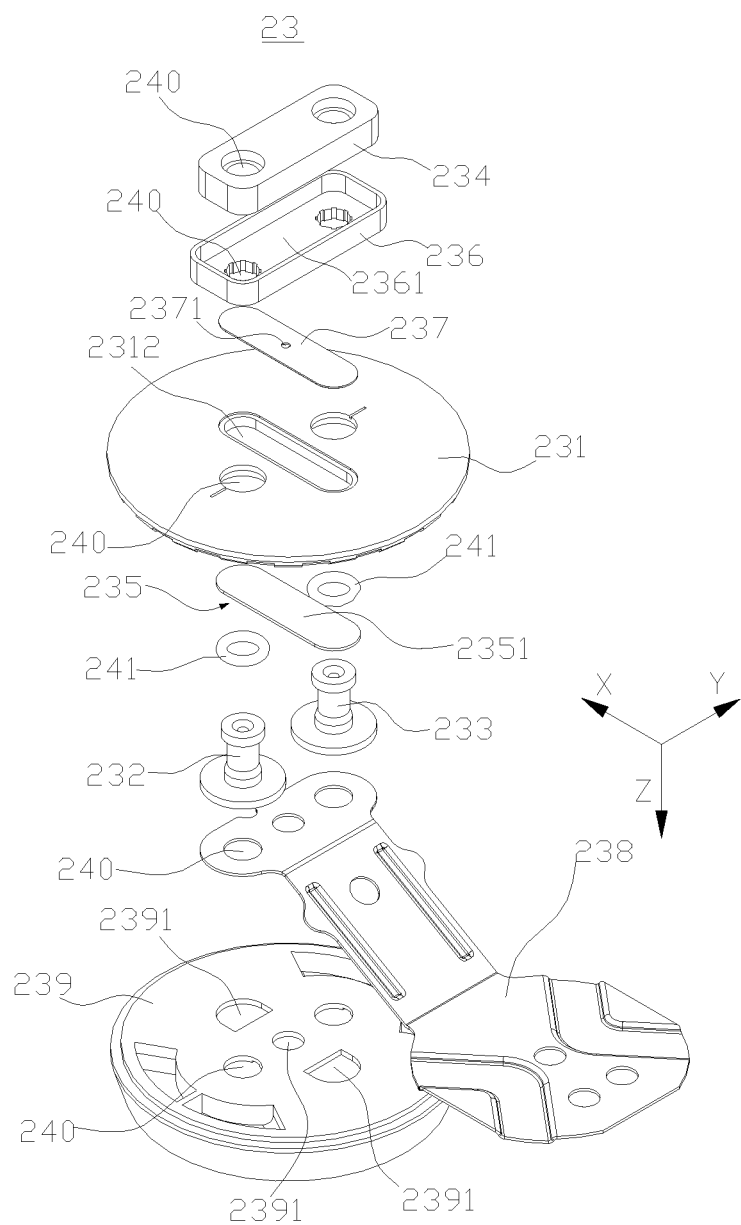
FIG. 4 is an exploded view of an end cover assembly according to some embodiments of this application.
Figure 5:
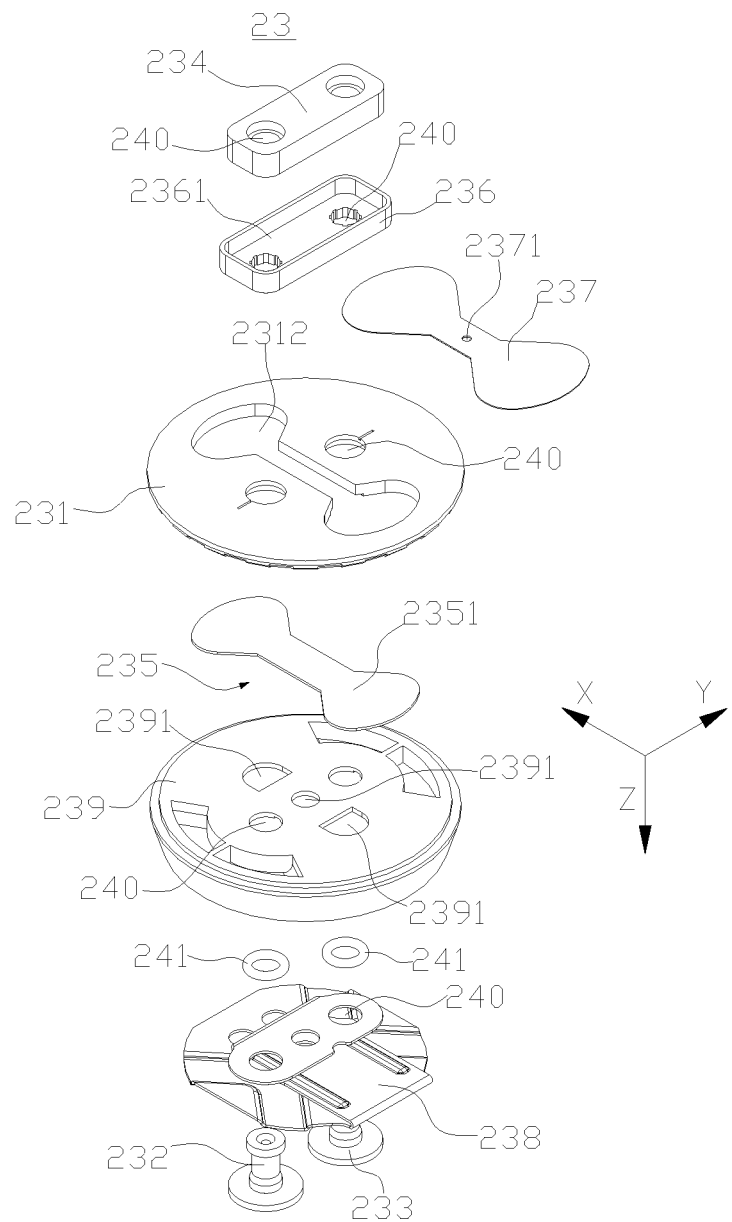
FIG. 5 is an exploded view of an end cover assembly according to some other embodiments of this application.

Referring to FIG. 4 and FIG. 5, FIG. 4 is an exploded view of an end cover assembly 23 according to some embodiments of this application, and FIG. 5 is an exploded view of an end cover assembly 23 according to some other embodiments of this application. The end cover assembly 23 may include an end cover 231, a first electrode terminal 232, a second electrode terminal 233, a connecting member 234, and a pressure relief mechanism 235.

The first electrode terminal 232 is installed on the end cover 231; and the second electrode terminal 233 is installed on the end cover 231, and the connecting member 234 is configured to be connected to the first electrode terminal 232 and the second electrode terminal 233. The connecting member 234 is on a side of the end cover 231 farther away from the inside of the battery cell 20 (refer to FIG. 3) in a first direction Z. The pressure relief mechanism 235 is disposed on the end cover 231, the pressure relief mechanism 235 is at least partially located between the first electrode terminal 232 and the second electrode terminal 233, and the pressure relief mechanism 235 is configured to be actuated when internal pressure or temperature of the battery cell 20 reaches a threshold, to relieve the internal pressure of the battery cell 20.

The pressure relief mechanism 235 in the end cover assembly 23 with the foregoing structure effectively uses space of the end cover 231 and between the first electrode terminal 232 and the second electrode terminal 233, so that the pressure relief mechanism 235 is more properly arranged, and a larger-sized pressure relief mechanism 235 can be disposed to improve a pressure relief capability of the pressure relief mechanism.

The end cover 231 in the end cover assembly 23 is configured to cover the opening 211 of the housing 21 (refer to FIG. 3). The end cover 231 may have various shapes, such as a round shape and a rectangular shape. A shape of the end cover 231 depends on a shape of the housing 21. If the housing 21 is a cylindrical structure, a round end cover 231 can be selected; or if the housing 21 is a cuboid structure, a rectangular end cover 231 can be selected. FIG. 4 and FIG. 5 show an example of a round end cover 231.

The first direction Z mentioned in this embodiment of this application is a thickness direction of the end cover 231, and if the end cover 231 is a round structure, the first direction Z is also an axial direction of the end cover 231.

It should be noted that polarities of the first electrode terminal 232 and the second electrode terminal 233 of the end cover assembly 23 may be the same or different.

In some embodiments, the polarities of the first electrode terminal 232 and the second electrode terminal 233 are the same, and the connecting member 234 is connected to the two electrode terminals with the same polarity. The connecting member 234 has a function of collecting electric energy, thereby enlarging a connection area between the battery cell 20 and a busbar.

The first electrode terminal 232 and the second electrode terminal 233 may both be positive electrode terminals configured to be electrically connected to a positive tab of an electrode assembly 22; or the first electrode terminal 232 and the second electrode terminal 233 may alternatively be both negative electrode terminals configured to be electrically connected to a negative tab of the electrode assembly 22.

In this embodiment, the battery cell 20 may have two end cover assemblies 23, an electrode terminal in one end cover assembly 23 is a positive electrode terminal, and an electrode terminal in the other end cover assembly 23 is a negative electrode terminal. Certainly, structures of the two end cover assemblies 23 may be the same or different. For example, one end cover assembly 23 is provided with a pressure relief mechanism 235, but the other end cover assembly 23 is not provided with a pressure relief mechanism 235.

When the polarities of the first electrode terminal 232 and the second electrode terminal 233 are the same, the connecting member 234 may be a conductor connected to the first electrode terminal 232 and the second electrode terminal 233, so that current from the first electrode terminal 232 and the second electrode terminal 233 is collected and conducted to the connecting member 234. When the two battery cells 20 are connected in series or in parallel through a busbar (not shown in the figure), the busbar may be connected to the connecting member 234. For example, the busbar is welded to the connecting member 234.

In some embodiments, the polarities of the first electrode terminal 232 and the second electrode terminal 233 are opposite, one of the first electrode terminal 232 and the second electrode terminal 233 is a positive electrode terminal configured to be electrically connected to a positive tab of an electrode assembly 22, and the other one of the first electrode terminal 232 and the second electrode terminal 233 is a negative electrode terminal configured to be electrically connected to a negative tab of the electrode assembly 22.

In this embodiment, the battery cell 20 may have one end cover assembly 23.

When the polarities of the first electrode terminal 232 and the second electrode terminal 233 are opposite, the connecting member 234 is connected between the first electrode terminal 232 and the second electrode terminal 233, to fasten the first electrode terminal 232 and the second electrode terminal 233.

Figure 6:
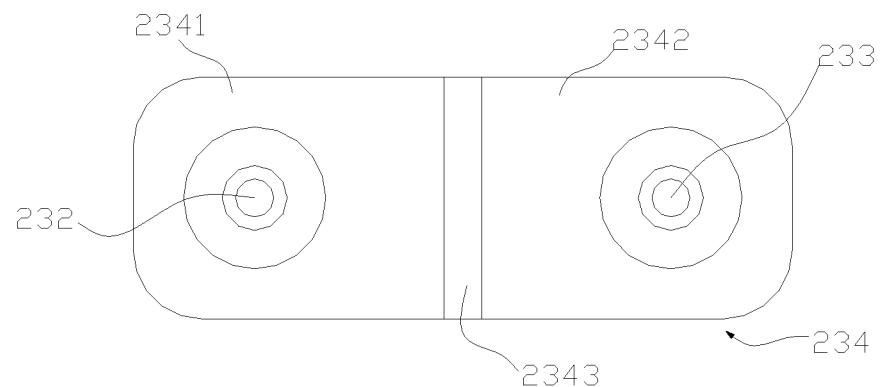
FIG. 6 is a schematic diagram of a connection from a connecting member to a first electrode terminal and a second electrode terminal according to some embodiments of this application.

It can be understood that the first electrode terminal 232 and the second electrode terminal 233 are not electrically connected through the connecting member 234. For example, referring to FIG. 6, FIG. 6 is a schematic structural diagram of a connection of the connecting member 234 to the first electrode terminal 232 and the second electrode terminal 233 according to some embodiments of this application. The connecting member 234 is a multi-segment structure. The connecting member 234 includes a first conductive segment 2341, a second conductive segment 2342, and an insulation segment 2343, and the first conductive segment 2341 and the second conductive segment 2342 are connected through the insulation segment 2343, to isolate the first conductive segment 2341 from the second conductive segment 2342. The first conductive segment 2341 is connected to the first electrode terminal 232, and the second conductive segment 2342 is connected to the second electrode terminal 233. The first conductive segment 2341 is configured to be connected and fastened to one busbar (not shown in the figure), and the second conductive segment 2342 is configured to be connected and fastened to another busbar.

Figure 7:
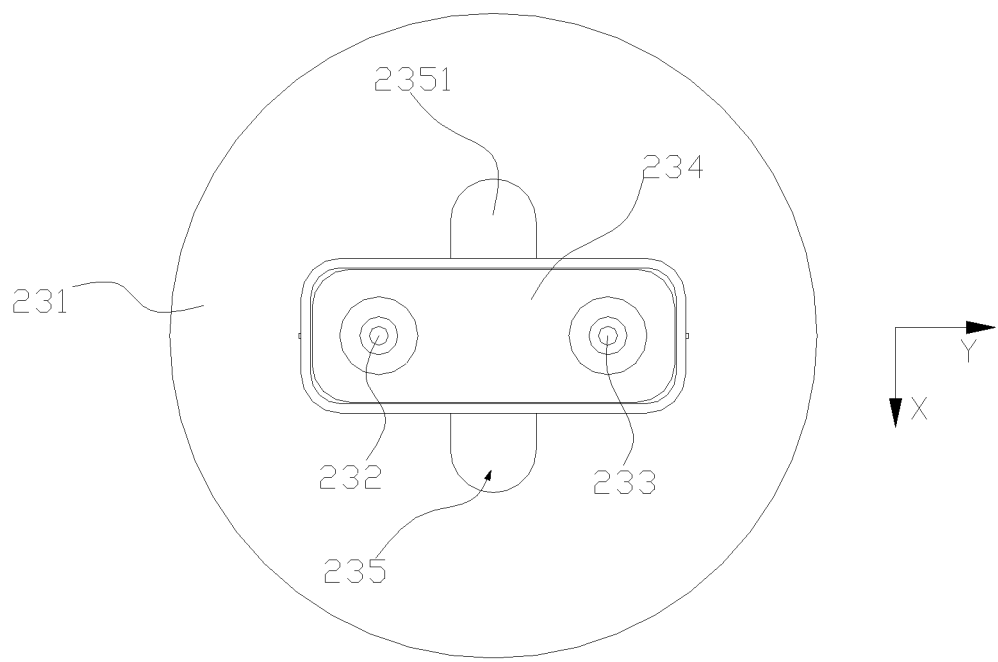
FIG. 7 is a top view of the end cover assembly shown in FIG. 4.
Figure 8:
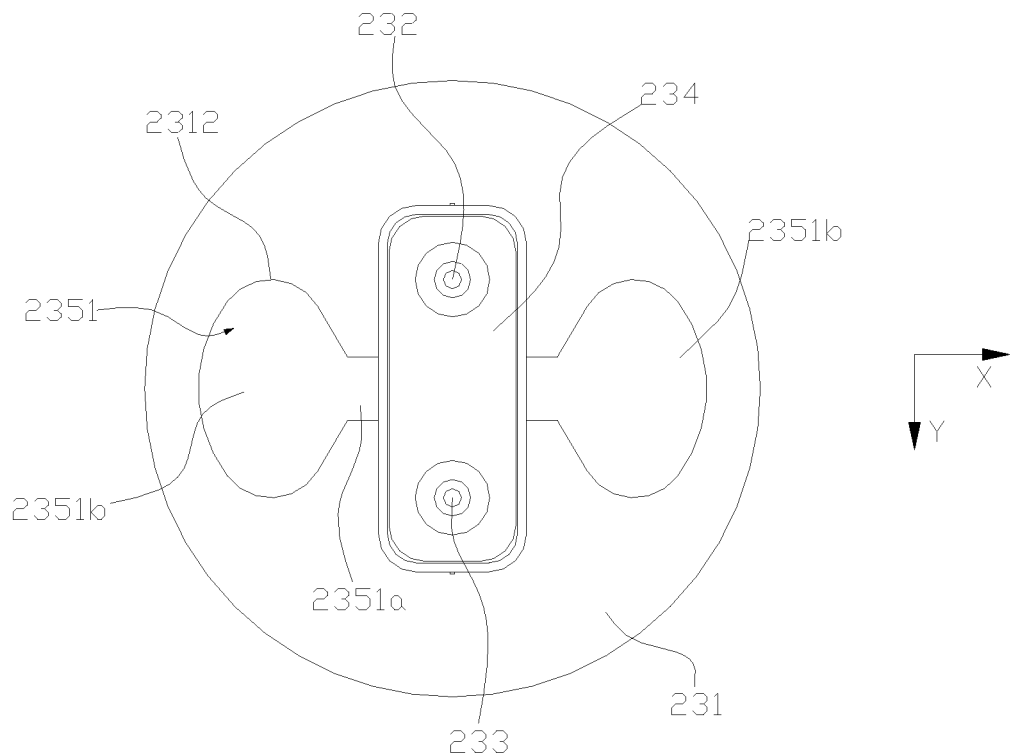
FIG. 8 is a top view of the end cover assembly shown in FIG. 5.

In some embodiments, referring to FIG. 7 and FIG. 8, FIG. 7 is a top view of the end cover assembly 23 shown in FIG. 4; and FIG. 8 is a top view of the end cover assembly 23 shown in FIG. 5. A projection of the connecting member 234 in the first direction Z (refer to FIG. 4 and FIG. 5) covers at least part of the pressure relief mechanism 235. That is, in the first direction Z, at least part of the pressure relief mechanism 235 is blocked by the connecting member 234, so that the pressure relief mechanism 235 effectively uses space, occupied by the connecting member 234, on the end cover 231, thereby more properly using the space on the end cover 231.

The pressure relief mechanism 235 may have various structures. The pressure relief mechanism 235 may be an explosion-proof valve, a rupture disk, a gas valve, a pressure relief valve, a safety valve, or the like. The pressure relief mechanism 235 may alternatively be a weak part on the end cover 231. Actuating the pressure relief mechanism 235 may be breaking a part of the pressure relief mechanism 235. For example, the pressure relief mechanism 235 is the rupture disk, and a part of the rupture disk is broken under pressure inside the battery cell 20. Alternatively, actuating the pressure relief mechanism 235 may be opening a part of the pressure relief mechanism 235. For example, the pressure relief mechanism 235 is a pressure relief valve, and a pressure relief hole of the pressure relief valve is opened.

In some embodiments, the pressure relief mechanism 235 includes an opening region 2351, and the pressure relief mechanism 235 is configured to relieve the internal pressure of the battery cell 20 through the opening region 2351 when the internal pressure or temperature of the battery cell 20 reaches the threshold. A projection of the connecting member 234 in the first direction Z covers a part of the opening region 2351, and a projection of the opening region 2351 in the first direction Z exceeds the projection of the connecting member 234 in the first direction Z. That is, at least part of the opening region 2351 is not blocked by the connecting member 234, so that the internal pressure of the battery cell 20 is more smoothly relieved through the opening region 2351.

The opening region 2351 is a part opened when the pressure relief mechanism 235 is actuated. For example, the pressure relief mechanism 235 is a weak part of the end cover 231, and the opening region 2351 is the weak part. For another example, the pressure relief mechanism 235 is a pressure relief valve, and the opening region 2351 is a pressure relief hole of the pressure relief valve. For still another example, the pressure relief mechanism 235 is a rupture disk, and the opening region 2351 is a to-be-destroyed part of the rupture disk.

In some embodiments, as shown in FIG. 4 and FIG. 5, the pressure relief mechanism 235 is a rupture disk, the end cover 231 is provided with a discharge hole 2312, and the rupture disk is fastened to the end cover 231 to seal the discharge hole 2312. When the internal pressure or temperature of the battery cell 20 reaches a threshold, a region, located within a range of the discharge hole 2312, of the rupture disk is destroyed, and an emission inside the battery 100 can be discharged through the discharge hole 2312 of the end cover 231, thereby relieving the internal pressure of the battery cell 20. It can be understood that a region, located within a range defined by a wall of the discharge hole 2312, of the rupture valve is the opening region 2351. For ease of description, hereinafter, the rupture disk is used as an example of the pressure relief mechanism 235, and the opening region 2351 of the rupture disk is used as an example of the opening region 2351 of the pressure relief mechanism 235.

For example, the end cover 231 is round, and the discharge hole 2312 is disposed at a center of the end cover 231.

In some embodiments, the opening region 2351 extends along a second direction X, and the connecting member 234 extends along a third direction Y; and any two of the first direction Z, the second direction X, and the third direction Y are perpendicular to each other. Such structure ensures that a region, blocked by the connecting member 234, of the opening region 2351 is smaller, and the internal pressure of the battery cell 20 is more smoothly relieved through the opening region 2351.

Because the opening region 2351 of the rupture disk is a region, located within a range defined by a wall of the discharge hole 2312, of the rupture disk, an extending direction (the second direction X) of the opening region 2351 is an extending direction of the discharge hole 2312.

In some embodiments, as shown in FIG. 7, width of the discharge hole 2312 on the end cover 231 in the third direction Y remains substantially unchanged in the second direction X. For example, the discharge hole 2312 is a bar-shaped hole. The connecting member 234 is a block-shaped member extending along the third direction Y. The first electrode terminal 232 and the second electrode terminal 233 are spaced apart along the third direction Y, and are respectively on two sides of the discharge hole 2312 in the third direction Y.

In some embodiments, as shown in FIG. 8, the opening region 2351 includes a first opening region 2351a and a second opening region 2351b, and the second opening region 2351b is arranged on at least one end of the first opening region 2351a in the second direction X. A projection of the connecting member 234 in the first direction Z (refer to FIG. 5) covers at least part of the first opening region 2351a. That is, in the first direction Z, at least part of the first opening region 2351a is blocked by the connecting member 234. A projection of the second opening region 2351b in the first direction Z exceeds the projection of the connecting member 234 in the first direction Z. That is, in the second direction X, at least part of the second opening region 2351b is not blocked by the connecting member 234. Width of the second opening region 2351b in the third direction Y is greater than width of the first opening region 2351a in the third direction Y. Such structure enlarges an area of the opening region 2351, and therefore the internal pressure of the battery cell 20 is more smoothly relieved through the opening region 2351.

Figure 9:
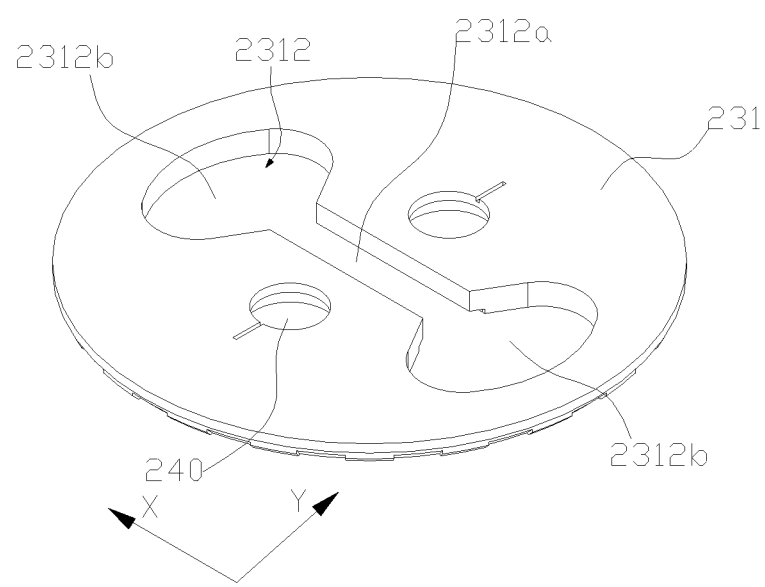
FIG. 9 is a schematic structural diagram of an end cover of the end cover assembly shown in FIG. 5.

Referring to FIG. 9. FIG. 9 is a schematic structural diagram of an end cover 231 of the end cover assembly 23 shown in FIG. 5. The discharge hole 2312 includes a first hole 2312a and a second hole 2312b communicating with each other, the second hole 2312b is disposed on at least one end of the first hole 2312a in the second direction X, the first hole 2312a is corresponding to the first opening region 2351a (refer to FIG. 8), and the second hole 2312b is corresponding to the second opening region 2351b (refer to FIG. 8).

For example, a second opening region 2351b is disposed on both ends of the first opening region 2351a. In the second direction X, two ends of the first opening region 2351a respectively exceed two sides of the connecting member 234, so that the projection of the connecting member 234 in the first direction Z covers only a part of the first opening region 2351a. That is, the connecting member 234 blocks only a part of the first opening region 2351a in the first direction Z. It can be understood that a second hole 2312b is disposed on both ends of the first hole 2312a.

The second opening region 2351b may have various shapes, such as a round shape, a rectangular shape, or an elliptical shape. FIG. 8 shows an example of an elliptical second opening region 2351b.

It can be learned from the foregoing embodiments that the projection of the connecting member 234 in the first direction Z can cover at least part of the pressure relief mechanism 235 so as to effectively use space on the end cover 231 that is occupied by the connecting member 234. In another embodiment, the projection of the connecting member 234 in the first direction Z may not cover the pressure relief mechanism 235. That is, in the first direction Z, the pressure relief mechanism 235 is not blocked by the connecting member 234. In this case, for example, the connecting member 234 may be an arc-shaped structure, the two ends of the connecting member 234 are respectively connected to the first electrode terminal 232 and the second electrode terminal 233, and an axis of an arc of the connecting member 234 is arranged along the first direction Z.

In some embodiments, as shown in FIG. 4 and FIG. 5, the end cover assembly 23 may further include a first insulation member 236, at least part of the first insulation member 236 is disposed between the connecting member 234 and the end cover 231 to isolate the end cover 231 from the connecting member 234.

The first insulation member 236 has an insulation function, the first insulation member 236 is an insulation material, and may be made of a material such as rubber and plastic, and the plastic may be PBT (Polybutylene terephthalate, polybutylene terephthalate), PET (Polyethylene terephthalate, polyethylene terephthalate), PA (Polyamide, polyamide), or the like.

In some embodiments, a groove 2361 is disposed on a side of the first insulation member 236 farther away from the end cover 231, and the connecting member 234 is disposed in the groove 2361 to increase a creepage distance between the first insulation member 236 and the end cover 231.

It should be noted that, when the end cover assembly 23 is provided with the first insulation member 236, the projection of the first insulation member 236 in the first direction Z may cover a part of the opening region 2351 of the pressure relief mechanism 235, and the projection of the opening region 2351 in the first direction Z exceeds the projection of the first insulation member 236 in the first direction Z. That is, the pressure relief mechanism 235 is not completely blocked by the first insulation member 236 in the first direction Z.

Figure 10:
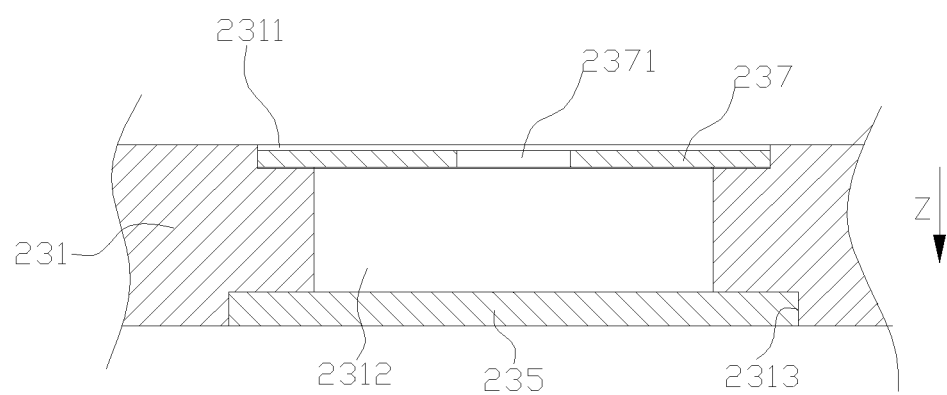
FIG. 10 is a schematic diagram of a connection between a shielding member, a pressure relief mechanism, and an end cover according to some embodiments of this application.

In some embodiments, referring to FIG. 10, FIG. 10 is a schematic diagram of a connection between a shielding member 237, a pressure relief mechanism 235, and an end cover 231 according to some embodiments of this application. The end cover assembly 23 may further include a shielding member 237 for shielding the pressure relief mechanism 235, and a first accommodation groove 2311 for accommodating the shielding member 237 is provided on the side of the end cover 231 closer to the connecting member 234, to reduce external space of the end cover 231 that is occupied by the shielding member 237.

For example, the shielding member 237 and the pressure relief mechanism 235 respectively block two ends of the discharge hole 2312, so that the shielding member 237 shields the pressure relief mechanism 235. The shielding member 237 has a good protection effect on the pressure relief mechanism 235, to reduce a risk that a foreign substance enters the discharge hole 2312 to contaminate and damage the pressure relief mechanism 235.

It should be noted that, relieving the internal pressure of the battery cell 20 through the pressure relief mechanism 235 may be detaching of the shielding member 237 from the end cover 231, or damaging the shielding member 237, so that the internal pressure of the battery cell 20 is smoothly relieved.

For example, the shielding member 237 is a plate-shaped structure, and the shielding member 237 may be bound to the end cover 231.

In some embodiments, the shielding member 237 is provided with a first through hole 2371, and the first through hole 2371 has a pressure balancing function for balancing pressure in a region between the shielding member 237 and the pressure relief mechanism 235 and external pressure, thereby preventing the shielding member from detaching from the end cover 231 or being damaged before the pressure relief mechanism 235 is actuated due to an excessively large region between the shielding member 237 and the pressure relief mechanism 235 (inner region of the discharge hole 2312).

For example, the shielding member 237 is a plate-shaped structure, depth of the first accommodation groove 2311 is greater than thickness of the shielding member 237, and after the shielding member 237 is accommodated in the first accommodation groove 2311 on the end cover 231, a gap between the shielding member 237 and the first insulation member 236 is enlarged, to reduce a risk of blocking the first through hole 2371 by the first insulation member 236.

In some embodiments, a second accommodation groove 2313 for accommodating the pressure relief mechanism 235 may be disposed on a side of the end cover 231 farther away from the connecting member 234, to reduce the external space of the end cover 231 that is occupied by the pressure relief mechanism 235.

In some embodiments, as shown in FIG. 4 and FIG. 5, the end cover assembly 23 may further include a current collector 238 configured to be connected to the first electrode terminal 232, the second electrode terminal 233, and an electrode assembly 22 of the battery cell 20. (refer to FIG. 3).

It should be noted that if the first electrode terminal 232 and the second electrode terminal 233 in the end cover assembly 23 have the same polarity, for example, both the first electrode terminal 232 and the second electrode terminal 233 are negative electrode terminals, the end cover assembly 23 may include one current collector 238, one end of the current collector 238 is connected to the first electrode terminal 232 and the second electrode terminal 233, and the other end of the current collector 238 is connected to a negative tab of the electrode assembly 22. Alternatively, if the first electrode terminal 232 and the second electrode terminal 233 in the end cover assembly 23 have opposite polarities, for example, the first electrode terminal 232 is a positive electrode terminal and the second electrode terminal 233 is a negative electrode terminal, the end cover assembly 23 may include two current collectors 238, one end of one current collector 238 is connected to the first electrode terminal 232, the other end of the current collector 238 is connected to a positive tab of the electrode assembly 22, one end of the other current collector 238 is connected to the second electrode terminal 233, and the other end of the other current collector 238 is connected to a negative tab of the electrode assembly 22. FIG. 4 and FIG. 5 show an example of a first electrode terminal 232 and a second electrode terminal 233 with the same polarity.

In some embodiments, the end cover assembly 23 may further include a second insulation member 239, and at least part of the second insulation member 239 is disposed between the end cover 231 and the current collector 238, to isolate the end cover 231 from the current collector 238.

The second insulation member 239 has an insulation function, the second insulation member 239 is an insulation material, and may be made of a material such as rubber and plastic, and the plastic may be PBT (Polybutylene terephthalate, polybutylene terephthalate), PET (Polyethylene terephthalate, polyethylene terephthalate), PA (Polyamide, polyamide), or the like.

Figure 11:
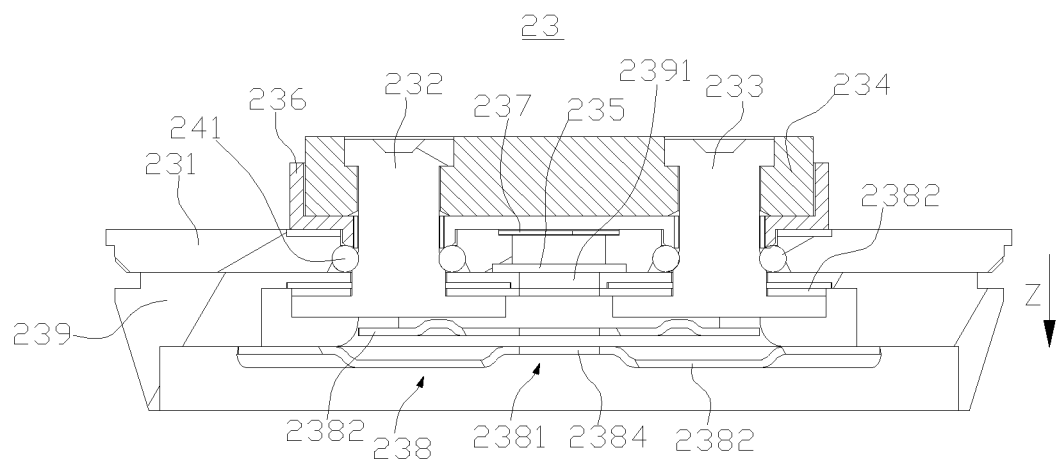
FIG. 11 is a cross-sectional view of an end cover assembly according to some embodiments of this application.

In some embodiments, referring to FIG. 11, FIG. 11 is a cross-sectional view of an end cover assembly 23 according to some embodiments of this application. For example, the first electrode terminal 232 and the second electrode terminal 233 have the same polarity, the connecting member 234, the first insulation member 236, the end cover 231, the second insulation member 239, and the current collector 238 are riveted together through the first electrode terminal 232 and the second electrode terminal 233.

As shown in FIG. 4 and FIG. 5, a riveting hole 240 used for the first electrode terminal 232 and the second electrode terminal 233 to pass through is disposed on each of the connecting member 234, the first insulation member 236, the end cover 231, the second insulation member 239, and the current collector 238.

In some embodiments, the end cover assembly 23 may further include a sealing ring 241, the sealing ring 241 is provided between the first electrode terminal 232 and the end cover 231, and the sealing ring 241 is provided between the second electrode terminal 233 and the end cover 231, to seal the riveting holes 240 on the end cover 231.

In some embodiments, further referring to FIG. 11, the current collector 238 is provided with a discharge channel 2381. An emission produced by the battery cell 20 due to thermal runaway can be discharged to outside of the battery cell 20 through the discharge channel 2381 and the pressure relief mechanism 235 in sequence, to relieve the internal pressure of the battery cell 20. In other words, when the thermal runaway occurs in the battery cell 20, an internal emission of the battery cell 20 can be discharged to outside of the battery cell 20 through the discharge channel 2381 and the pressure relief mechanism 235 in sequence, so that the emission produced due to the thermal runaway of the battery cell 20 can be discharged in a timely manner, to relieve internal pressure of the battery cell 20.

It should be noted that, that the emission produced due to the thermal runaway of the battery cell 20 can be discharged to the outside of the battery cell 20 through the discharge channel 2381 and the pressure relief mechanism 235 in sequence does not limit that the emission produced due to the thermal runaway of the battery cell 20 can be discharged to the outside of the battery cell 20 only through the discharge channel 2381 and the pressure relief mechanism 235 in sequence. The emission can alternatively be discharged to the outside of the battery cell 20 through another path. For example, some emissions are directly discharged to the outside of the battery cell 20 through the pressure relief mechanism 235.

Figure 13:
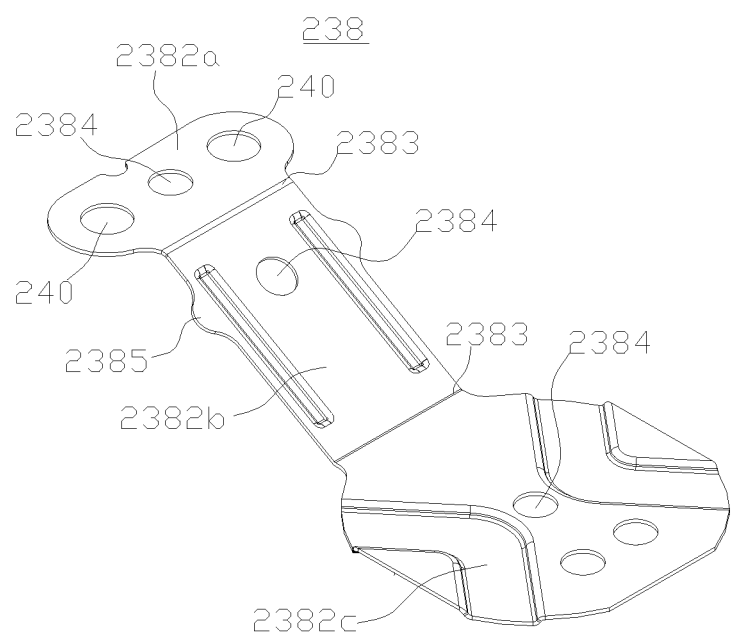
FIG. 13 is a schematic structural diagram of a current collector (unfolded) of an end cover assembly according to some embodiments of this application.

In some embodiments, also referring to FIG. 13, the current collector 238 includes a plurality of folding portions 2382, a crease 2383 is formed between every two adjacent folding portions 2382, each folding portion 2382 is provided with a second through hole 2384, and a plurality of second through holes 2384 jointly form the discharge channel 2381.

The current collector 238 being a folding structure helps to dispose the current collector 238 between the end cover 231 and the electrode assembly 22, thereby reducing the space occupied by the current collector 238. The current collector 238 has a folded state (refer to FIG. 5) and an unfolded state (refer to FIG. 4). In the folded state, the plurality of second through holes 2384 can jointly form the discharge channel 2381.

It should be noted that the discharge channel 2381 may alternatively be another structure. For example, the current collector 238 is a non-folding plate-shaped structure, and the current collector 238 is disposed flat. In this case, the discharge channel 2381 may be a hole or notch on the current collector 238.

In some embodiments, projections of the plurality of second through holes 2384 in the first direction Z at least partially overlap the projection of the pressure relief mechanism 235 in the first direction Z. That is, the plurality of first through holes 2371 are substantially aligned with the pressure relief mechanism 235 in the first direction Z. With such structure, the emission in the battery cell 20 is less blocked by the current collector 238, the emission is more smoothly discharged to the outside through the discharge channel 2381 and the pressure relief mechanism 235, so that the emission is more easily discharged to the outside of the battery cell 20.

For example, the plurality of second through holes 2384 are substantially aligned with the opening region 2351 (refer to FIG. 7 and FIG. 8) of the pressure relief mechanism 235 in the first direction Z. It can be understood that the plurality of second through holes 2384 are aligned with the discharge hole 2312 on the end cover 231 in the first direction Z.

In some embodiments, one or more third through holes 2391 may be disposed on the second insulation member 239. At least one through hole is substantially aligned with the discharge channel 2381 and the pressure relief mechanism 235 in the first direction Z, so that the emission in the battery cell 20 is less blocked by the second insulation member 239, helping the emission smoothly reach the pressure relief mechanism 235 through the discharge channel 2381.

Figure 12:
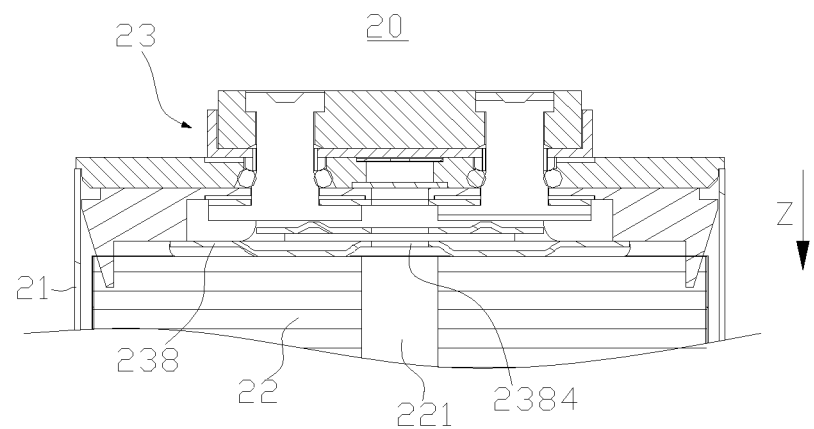
FIG. 12 is a partial cross-sectional view of a battery cell according to some embodiments of this application.

In some embodiments, referring to FIG. 12, FIG. 12 is a partial cross-sectional view of a battery cell 20 according to some embodiments of this application. Projections of the plurality of second through holes 2384 in the first direction Z at least partially overlap a projection of a central hole 221 of the electrode assembly 22 in the first direction Z. That is, the plurality of second through holes 2384 are substantially aligned with the central hole 221 of the electrode assembly 22 in the first direction Z. With such structure, the discharge channel 2381 and the central hole 221 of the electrode assembly 22 jointly form a straight-through channel to balance pressure on both sides of the electrode assembly 22 in an axial direction of the central hole 221, thereby reducing a risk of damage to the pressure relief mechanism 235 caused by excessively high pressure on one side of the electrode assembly 22 closer to the end cover 231.

For example, when the battery cell 20 is dropped, the electrode assembly 22 is displaced relative to the end cover 231 under action of inertia, space between the electrode assembly 22 and the end cover 231 is compressed, and pressure in the region between the electrode assembly 22 and the end cover 231 is increased. Because the discharge channel 2381 and the central hole 221 of the electrode assembly 22 jointly form the straight-through channel, a medium (such as gas) between the electrode assembly 22 and the end cover 231 can enter the central hole 221 of the electrode assembly 22 through the discharge channel 2381 of the current collector 238, and finally reaches a side of the electrode assembly 22 farther away from the end cover 231 to balance the pressure on both the sides of the electrode assembly 22 in the axial direction of the central hole 221.

In some embodiments, referring to FIG. 13, FIG. 13 is a schematic structural diagram of a current collector 238 (in an unfolded state) of an end cover assembly 23 according to some embodiments of this application. A guide protruding portion 2385 is provided on at least one side of a part, provided with the second through hole 2384, of at least one folding portion 2382 of the current collector 238 in an extending direction of the crease 2383, to increase a current flow area of the part, provided with the second through hole 2384, of the folding portion 2382.

The current collector 238 may have two, three, four or more folding portions 2382.

In some embodiments, as shown in FIG. 13, the current collector 238 includes a first folding portion 2382a, a second folding portion 2382b, and a third folding portion 2382c, the first folding portion 2382a, the second folding portion 2382b, and the third folding portion 2382c are connected in sequence, and the first folding portion 2382a is configured to electrically connected to the first electrode terminal 232 (refer to FIG. 11) and the second electrode terminal 233 (refer to FIG. 11). The third folding portion 2382c is configured to be electrically connected to the electrode assembly 22 (refer to FIG. 12).

In some embodiments, as shown in FIG. 13, in the extending direction of the crease 2383, width of the first folding portion 2382a and width of the third folding portion 2382c are both larger than width of the second folding portion 2382b. With such structure, the width of the second folding portion 2382b is relatively small to reduce materials for the current collector 238, and it is also ensured that the first folding portion 2382a is more easily connected to the first electrode terminal 232 and the second electrode terminal 233, and that the third folding portion 2382c is more easily connected to the electrode assembly 22.

In some embodiments, a guide protruding portion 2385 is provided on at least one side of a part, provided with the second through hole 2384, of the second folding portion 2382b in the extending direction of the crease 2383, to increase a current flow area of the part, provided with the second through hole 2384, of the second folding portion 2382b.

For example, a guide protruding portion 2385 is provided on both sides of a part, provided with the second through hole 2384, of the second folding portion 2382b in the extending direction of the crease 2383.

Figure 14:
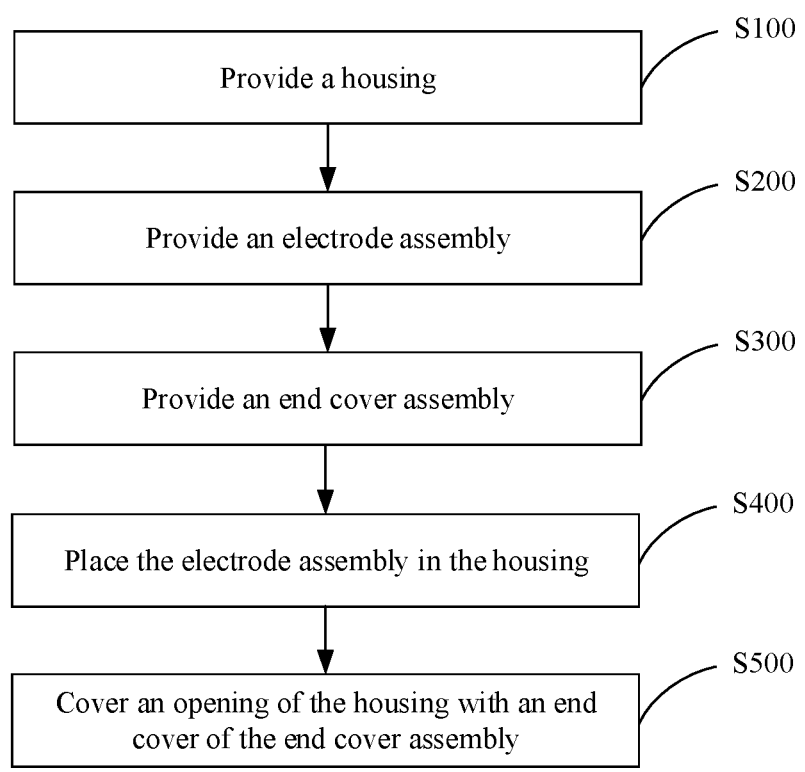
FIG. 14 is a flowchart of a manufacturing method of a battery cell according to some embodiments of this application.

Referring to FIG. 14, FIG. 14 is a flowchart of a manufacturing method of a battery cell 20 according to some embodiments of this application. The manufacturing method of a battery cell 20 includes the following steps:

S100. Provide a housing 21, where the housing 21 has an opening 211.

S200. Provide an electrode assembly 22.

S300. Provide an end cover assembly 23, where the end cover assembly 23 includes: an end cover 231, a first electrode terminal 232, a second electrode terminal 233, a connecting member 234, and a pressure relief mechanism 235, where the first electrode terminal 232 is installed on the end cover 231; the second electrode terminal 233 is installed on the end cover 231; the connecting member 234 is configured to be connected to the first electrode terminal 232 and the second electrode terminal 233, where the connecting member 234 is on a side of the end cover 231 farther away from inside of the battery cell 20 in a first direction Z; and the pressure relief mechanism 235 is disposed on the end cover 231, where the pressure relief mechanism 235 is at least partially located between the first electrode terminal 232 and the second electrode terminal 233, and the pressure relief mechanism 235 is configured to be actuated when internal pressure or temperature of the battery cell 20 reaches a threshold, to relieve the internal pressure of the battery cell 20.

S400. Place the electrode assembly 22 in the housing 21.

S500. Cover the opening 211 of the housing 21 with the end cover 231 of the end cover assembly 23.

The first electrode terminal 232 and the second electrode terminal 233 are configured to be electrically connected to the electrode assembly 22.

It should be noted that when the battery cell 20 is assembled in the foregoing manufacturing method of a battery cell 20, a sequence of performing steps S100, S200, and S300 is not limited. For example, step S300 may be performed first, that is, the end cover assembly 23 is provided. Then, step S200 is performed.

For a related structure of the battery cell 20 manufactured in the foregoing manufacturing method of a battery cell 20, refer to the battery cell 20 provided in the foregoing embodiments.

It should be noted that, without conflict, the embodiments and features in the embodiments in this application may be combined with each other.

The foregoing embodiments are merely used to describe a technical solution in this application, but are not intended to limit this application. A person skilled in the art understands that this application may have various modifications and variations. Any modification, equivalent replacement, and improvement made without departing from the spirit and principle of this application shall fall within the protection scope of this application.

The invention claimed is:

1. An end cover assembly, applied to a battery cell and comprising:
   an end cover;
   a first electrode terminal installed on the end cover;
   a second electrode terminal installed on the end cover;
   a connecting member, configured to be connected to the first electrode terminal and the second electrode terminal, wherein the connecting member is on a side of the end cover farther away from inside of the battery cell in a first direction; and
   a pressure relief mechanism, disposed on the end cover, wherein the pressure relief mechanism is at least partially located between the first electrode terminal and the second electrode terminal such that the pressure relief mechanism is disposed in a non-overlapping region through a direct axis connecting the first and second electrode terminals, and the pressure relief mechanism is configured to be actuated when internal pressure or temperature of the battery cell reaches a threshold, to relieve the internal pressure of the battery cell;
   wherein the pressure relief mechanism comprises an opening region, and the pressure relief mechanism is configured to relieve the internal pressure of the battery cell through the opening region when the internal pressure or temperature of the battery cell reaches the threshold; and
   a projection of the connecting member in the first direction covers a part of the opening region, and a projection of the opening region in the first direction exceeds the projection of the connecting member in the first direction.

2. The end cover assembly according to claim 1, wherein the projection of the connecting member in the first direction covers at least part of the pressure relief mechanism and the connecting member is positioned at a height substantially the same as a height of the first and second electrode terminals in the first direction.

3. The end cover assembly according to claim 1, wherein the opening region extends along a second direction, and the connecting member extends along a third direction;
   any two of the first direction, the second direction, and the third direction are perpendicular to each other.

4. The end cover assembly according to claim 3, wherein the opening region comprises a first opening region and a second opening region, and the second opening region is arranged on at least one end of the first opening region in the second direction;
   the projection of the connecting member in the first direction covers at least part of the first opening region, a projection of the second opening region in the first direction exceeds the projection of the connecting member in the first direction, and width of the second opening region in the third direction is greater than width of the first opening region in the third direction; and
   any two of the first direction, the second direction, and the third direction are perpendicular to each other.

5. The end cover assembly according to claim 1, wherein the end cover assembly further comprises a shielding member for shielding the pressure relief mechanism; and
   a first accommodation groove for accommodating the shielding member is provided on a side of the end cover closer to the connecting member.

6. The end cover assembly according to claim 5, wherein the shielding member is provided with a first through hole.

7. The end cover assembly according to claim 1, wherein the first electrode terminal and the second electrode terminal have same polarity.

8. The end cover assembly according to claim 7, wherein the end cover assembly further comprises a current collector, and the current collector is configured to be connected to the first electrode terminal, the second electrode terminal, and an electrode assembly of the battery cell;
   a discharge channel is disposed on the current collector; and
   an emission produced by the battery cell due to thermal runaway is able to be discharged to outside of the battery cell through the discharge channel and the pressure relief mechanism in sequence, to relieve the internal pressure of the battery cell.

9. The end cover assembly according to claim 8, wherein the current collector comprises a plurality of folding portions, a crease is formed between every two adjacent folding portions, each folding portion is provided with a second through hole, and a plurality of second through holes jointly form the discharge channel.

10. The end cover assembly according to claim 9, wherein projections of the plurality of second through holes in the first direction overlap at least part of the projection of the pressure relief mechanism in the first direction.

11. The end cover assembly according to claim 9, wherein projections of the plurality of second through holes in the first direction overlap at least part of a projection of a central hole of the electrode assembly in the first direction.

12. The end cover assembly according to claim 9, wherein a guide protruding portion is provided on at least one side of a part, provided with the second through hole, of at least one folding portion in an extending direction of the crease.

13. The end cover assembly according to claim 9, wherein the plurality of folding portions comprise a first folding portion, a second folding portion, and a third folding portion connected in sequence;
- the first folding portion is configured to be electrically connected to the first electrode terminal and the second electrode terminal;
- the third folding portion is configured to be electrically connected to the electrode assembly;
- width of the first folding portion and width of the third folding portion are both greater than width of the second folding portion in an extending direction of the crease; and
- a guide protruding portion is provided on at least one side of a part, provided with the second through hole, of the second folding portion in the extending direction of the crease.

14. A battery cell, comprising:
a housing having an opening;
an electrode assembly accommodated in the housing; and
the end cover assembly according to claim 1, wherein an end cover is configured to cover the opening, and the first electrode terminal and the second electrode terminal are configured to be electrically connected to the electrode assembly.

15. A battery, comprising:
a box; and
the battery cell according to claim 14, wherein the battery cell is accommodated in the box.

16. An electric device, comprising the battery cell according to claim 14.

17. A manufacturing method of a battery cell, comprising:
providing a housing, wherein the housing has an opening;
providing an electrode assembly;
providing an end cover assembly, wherein the end cover assembly comprises:
an end cover;
a first electrode terminal installed on the end cover;
a second electrode terminal installed on the end cover;
a connecting member, configured to be connected to the first electrode terminal and the second electrode terminal, wherein the connecting member is on a side of the end cover farther away from inside of the battery cell in a first direction; and
a pressure relief mechanism, disposed on the end cover, wherein the pressure relief mechanism is at least partially located between the first electrode terminal and the second electrode terminal such that the pressure relief mechanism is disposed in a non-overlapping region through a direct axis connecting the first and second electrode terminals, and the pressure relief mechanism is configured to be actuated when internal pressure or temperature of the battery cell reaches a threshold, to relieve the internal pressure of the battery cell;
wherein the pressure relief mechanism comprises an opening region, and the pressure relief mechanism is configured to relieve the internal pressure of the battery cell through the opening region when the internal pressure or temperature of the battery cell reaches the threshold; and
a projection of the connecting member in the first direction covers a part of the opening region, and a projection of the opening region in the first direction exceeds the projection of the connecting member in the first direction;
placing the electrode assembly in the housing; and
covering the opening with the end cover, wherein
the first electrode terminal and the second electrode terminal are configured to be electrically connected to the electrode assembly.

* * * * *